(12) United States Patent
Haeberer et al.

(10) Patent No.: US 8,225,598 B2
(45) Date of Patent: Jul. 24, 2012

(54) METERING DEVICE FOR LIQUID REDUCING AGENT

(75) Inventors: Rainer Haeberer, Bretten (DE);
Matthias Horn, Freiberg (DE);
Hartmut Lueders, Oberstenfeld (DE);
Leopold Bernegger, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 12/521,411

(22) PCT Filed: Nov. 15, 2007

(86) PCT No.: PCT/EP2007/062419
§ 371 (c)(1),
(2), (4) Date: Sep. 9, 2010

(87) PCT Pub. No.: WO2008/080692
PCT Pub. Date: Jul. 10, 2008

(65) Prior Publication Data
US 2010/0319326 A1    Dec. 23, 2010

(30) Foreign Application Priority Data
Dec. 28, 2006  (DE) .......................... 10 2006 061 731

(51) Int. Cl.
*F01N 3/00*    (2006.01)
(52) U.S. Cl. ................ 60/286; 60/274; 60/295; 60/296; 60/301; 60/303
(58) Field of Classification Search ................ 60/274, 60/286, 295, 296, 301, 303, 316, 319
See application file for complete search history.

(56) References Cited

U.S. PATENT DOCUMENTS

| | | | |
|---|---|---|---|
| 5,884,475 A * | 3/1999 | Hofmann et al. ............... | 60/274 |
| 6,912,846 B2 * | 7/2005 | Huber et al. .................... | 60/286 |
| 7,654,080 B2 * | 2/2010 | Ripper et al. ................... | 60/286 |
| 7,874,148 B2 * | 1/2011 | Duffield ......................... | 60/297 |
| 7,886,525 B2 * | 2/2011 | Nishibu et al. ................. | 60/286 |
| 2007/0283685 A1 | 12/2007 | Ripper et al. | |

FOREIGN PATENT DOCUMENTS

| | | | |
|---|---|---|---|
| DE | 102004054238 A1 | | 5/2006 |
| WO | 0021881 A1 | | 4/2000 |
| WO | WO 2006/064028 | * | 6/2006 |

* cited by examiner

*Primary Examiner* — Binh Q Tran
(74) *Attorney, Agent, or Firm* — Ronald E. Greigg (57) ABSTRACT

A metering device for introducing liquid reducing agent into an exhaust gas pipe. A metering valve is supplied with contents from a working tank by a delivery unit and dispenses the tank contents in a discharge direction. The delivery unit establishes a negative pressure between the delivery unit and the metering valve when the delivery direction is reversed. The negative pressure causes gas to be drawn off through the metering valve against the discharge direction. The delivery direction is reversed by either a feed pump with a reversible effective direction or a feed pump and a repolarization valve which communicates with the feed pump and transposes an inlet and an outlet of the feed pump.

17 Claims, 4 Drawing Sheets

METERING DEVICE FOR LIQUID REDUCING AGENT

CROSS-REFERENCE TO RELATED APPLICATION

This application is a 35 USC 371 application of PCT/EP 2007/062419 filed on Nov. 15, 2007.

BACKGROUND OF THE INVENTION

1. Field of the Invention

The invention is based on a metering device for introducing liquid reducing agent into an exhaust gas tract.

2. Description of the Prior Art

In the operation of internal combustion engines, exhaust gases are produced, which contain nitrogen oxides. For reducing the nitrogen oxides, liquid reducing agent is used, which reduces $NO_x$ to $N_3$ and $H_2O$. To that end, the liquid reducing agent is introduced into the exhaust gas tract of the engine via a metering valve.

With typical liquid reducing agent there is the danger that it will freeze at low temperatures. Depending on the antifreeze agent used, the freezing point is between $-11°$ C. and approximately $-40°$ C. At the phase transition of the liquid reducing agent to the solid phase, an increase of up to 10% in volume can occur, so that the components of the metering device must have a suitable resistance to ice pressure. Alternatively, other measures are employed for protecting the affected components from freezing of the reducing agent. The resistance to ice pressure of the metering valve, which injects the liquid reducing agent into the exhaust gas tract, is of particular relevance for the function of the metering device.

In utility vehicles, the additional line that serves to actively cool the metering valve with reducing agent is used for ventilation. In that case, the additional line serves to aspirate air from the air space in the tank and to use it for ventilating the metering device. As a result of the ventilation, the liquid reducing agent is removed from the individual components, and as a result, if freezing occurs, no damage ensues. However, in that system two lines are required, one supply line and the additional line, which is also used for the active cooling. In the passenger car, for example, passive cooling is employed, and thus no second line is available.

In German patent disclosure DE 10 2004 054 238 A1, a metering system is described in which a feed pump for reducing agent furnishes reducing agent to a metering valve in a feeding direction, while in the reverse feeding direction it aspirates fresh air via a valve, in order the ventilate the metering system. For delivering the fresh air, an additional controllable ventilation valve is employed.

SUMMARY OF THE INVENTION

The metering device of the invention and the method of the invention for operating a metering device make ventilation of the metering device possible without having to provide an additional ventilation valve. No additional ventilation line is then required. The metering device of the invention includes only those components that are necessary for introducing the reducing agent, but at the same time it allows ventilation of the delivery unit, and for the ventilation, the same components are used that also serve to introduce liquid reducing agent. The device and the method of the invention make it possible to remove liquid reducing agent, so that even at low temperatures, no damage from ice formation can occur. As a result, leakage of the reducing agent at the metering valve seat, which can occur in other, unventilated metering devices, is averted.

In one aspect of the invention, the delivery unit, which in the normal operating mode delivers the reducing agent to the metering valve, is used for evacuating or venting the metering valve. To that end, with the reverse feeding direction, the metering valve is opened, so that gas from the exhaust gas tract enters the metering valve counter to the feeding direction. As a result, the metering valve and the lines leading to it are evacuated.

In an embodiment of the invention, for that purpose the working direction of the pump provided in the delivery unit is reversed. Alternatively, the working direction of the pump can be retained as is, and a repolarization valve can be provided, which transposes the aspiration inlet and the dispensing outlet of the pump, so that for the remaining system connected to them, the functions of the two connections of the delivery unit are transposed In a further aspect of the invention, the delivery unit delivers the reducing agent from a working tank, which is tilled at regular intervals from a storage tank. The storage tank communicates with the delivery unit via a filling line, and the filling line has a connection/blocking valve that can be triggered in order to block the fluid flow leading into the storage tank. The connection/blocking valve may be embodied as a check valve, which passively allows the fluid flow in only one direction and has a slight minimal opening pressure in that direction. Alternatively, this may be provided in the form of an active valve, which can be adjusted actively by a control system. In this way, a control system can open or close the connection/blocking valve. Preferably, the control system opens or closes the connection/blocking valve as a function of the feeding direction of the delivery unit. If the feeding direction is reversed and the metering valve is closed, with suitable triggering of the connection/blocking valve, if it is an active connection/blocking valve, reducing agent can be delivered from the storage tank to the working tank.

By dividing the tank in two, the space provided in the motor vehicle can be better utilized. Moreover, the working tank can have a heater, so that only a portion of the total quantity of reducing agent stored in the vehicle has to be heated, in the event that it has frozen. As a result, the time needed for operational readiness of the metering device can be shortened. The filling of the working tank can be done during after-running, i.e., after the internal combustion engine has been shut off. Alternatively, the working tank is refilled when the engine is generating only little nitrogen oxide.

In an embodiment of the invention, the storage tank communicates with the feed pump via the connection/blocking valve. The feed pump in turn has direct access to the working tank. The metering valve is preferably connected to the communication between the connection/blocking valve and the delivery unit. In this embodiment of the invention, the closing function of the metering valve serves on the one hand to limit the amount of metered agent injected into the exhaust gas tract. On the other, blocking of the metering valve at the same time the feeding direction is reversed makes it possible to use the delivery unit not only for supplying the metering valve with reducing agent, but also for delivering reducing agent from the storage tank to the working tank by means of the connection/blocking valve, bypassing the metering valve. In this way, an additional function can be provided, without requiring additional components. In other words, both the properties and the nature of the metering valve and delivery unit make it possible to take on two functions, that is, injecting reducing agent and repeatedly filling the working tank from the storage tank.

In a device according to the invention, the connection/blocking valve is arranged for controllably blocking the fluid flow into the storage tank while the delivery unit is operating in the feeding direction and is blocking the metering valve. As a result, the connection/blocking valve as well can be ventilated because gas is conducted to the storage tank. As a result, on the one hand the delivery unit enables ventilation of the connection/blocking valve because gas, which previously on reversal of the feeding direction reached the metering device via the metering valve, to be used for ventilation of the connection/blocking valve by means of blocking the metering valve and operating the delivery unit in the feeding direction. The connection/blocking valve can also be embodied as a throttle restriction, the flow rate of which can be controlled from outside.

Thus the metering valve and the delivery unit have a further function of introducing already-aspirated gas, such as exhaust gas, into the open connection valve and thus at low temperatures protecting against damage from ice pressure. Preferably, the delivery unit is operated only briefly, so that the metering device, in particular the feed pump and metering valve, will not fill with metered agent from the working tank again. The line between the metering valve, feed pump and working tank therefore includes a volume that is larger than that of the connection between the connection valve and the coupling point of the metering valve, so that initially a larger volumetric quantity of exhaust gas can reach the metering device via the metering valve, a quantity that is sufficient to evacuate not only the connection/blocking valve but also the line leading from the connection/blocking valve to the metering valve.

In a preferred embodiment of the invention, the venting and ventilating devices for the tank or tanks, for instance in the form of valve or throttles, make it possible to equalize the pressure with the surroundings. As a result, the negative pressure and the overpressure that occur from pumping and transferring the tank contents are compensated for.

BRIEF DESCRIPTION OF THE DRAWINGS

Exemplary embodiments of the invention are described in further detail below in conjunction with the drawings, in which.

DESCRIPTION OF THE PREFERRED EMBODIMENTS

Figure 1:
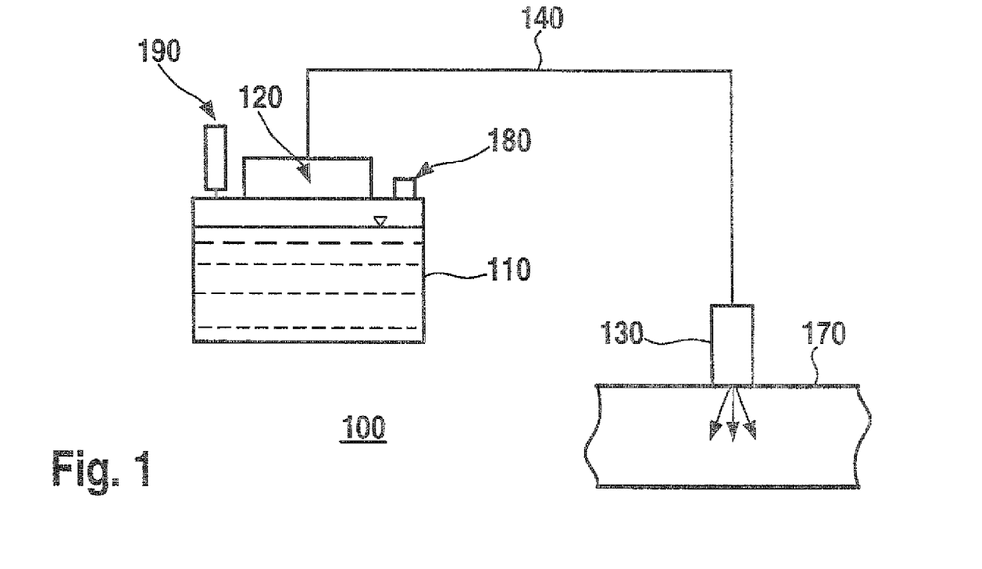
FIG. 1 shows an embodiment of the metering device of the invention in the injection mode.

In FIG. 1, a metering device is shown, which has a tank 110, a delivery unit 120, and a metering valve 130. The delivery unit delivers the contents of the tank 110 via a line 140 to the metering valve 130. The metering valve 130 is connected in a dispensing direction to an exhaust pipe 170, which represents part of an exhaust gas tract. The metering valve 130 is secured to the exhaust pipe 170 by suitable means, such as an adapter, a plug connection, a screw connection, a flange, and/or a bayonet mount. The line 140 may be embodied in one piece with the metering valve 130, or it may be connected to the metering valve via a plug connection.

The delivery unit 120 is likewise connected to line 140 via a stable connection, for instance by means of a one-piece embodiment, a plug connection, or one of the kinds of connection mentioned above. The tank 110 can be filled via a fill opening 180. A ventilation/venting valve 190 is also in fluidic communication with the tank 110, to compensate for an overpressure or a negative pressure in the tank compared to the surroundings. Alternatively or in combination with this, a throttle is used for ventilation or venting, to prevent irritation from odors originating in strong metered agents and strong concentrations of ammonia in the exterior.

Preferably, the ventilation and venting valve 190 and/or the fill opening 180 are disposed on the upper side of the tank. Given suitable orientation of the tank 110 in a motor vehicle, the fill opening 180 and in particular the ventilation/venting valve 190 remain dry. The delivery unit 120 includes a pump, which communicates with a line whose lower end is disposed at the base of the tank 110. Hence the supply of reducing agent to the metering device is assured even at low fluid levels.

The delivery unit 120 delivers the tank contents 110, that is, the liquid reducing agent used for nitrogen removal, such as aqueous urea solution, to the metering valve 130, so that an overpressure exists in line 140. The metering valve 130 may optionally be partly or fully open, so as to introduce reducing agent into the exhaust pipe 170. Alternatively or in combination with this, the delivery unit 120 can be triggered for delivering no reducing agent or only a certain amount of reducing agent, depending on the quantity of reducing agent required. The flow rate can be adjusted with continuously variable values via the level of an electrical signal or via a pulse width modulated control signal.

If the metering device 100 is shut off after operation and the temperature drops below the freezing point of the reducing agent, then the reducing agent remaining in the delivery unit 120, in the line 140 and in the metering valve 130, but especially in the metering valve 130, freezes. The frozen reducing agent expands at this point in the phase transition to a solid. This can damage the metering valve, for instance from permanent deformation caused by the change in volume at the phase transition.

Figure 2:
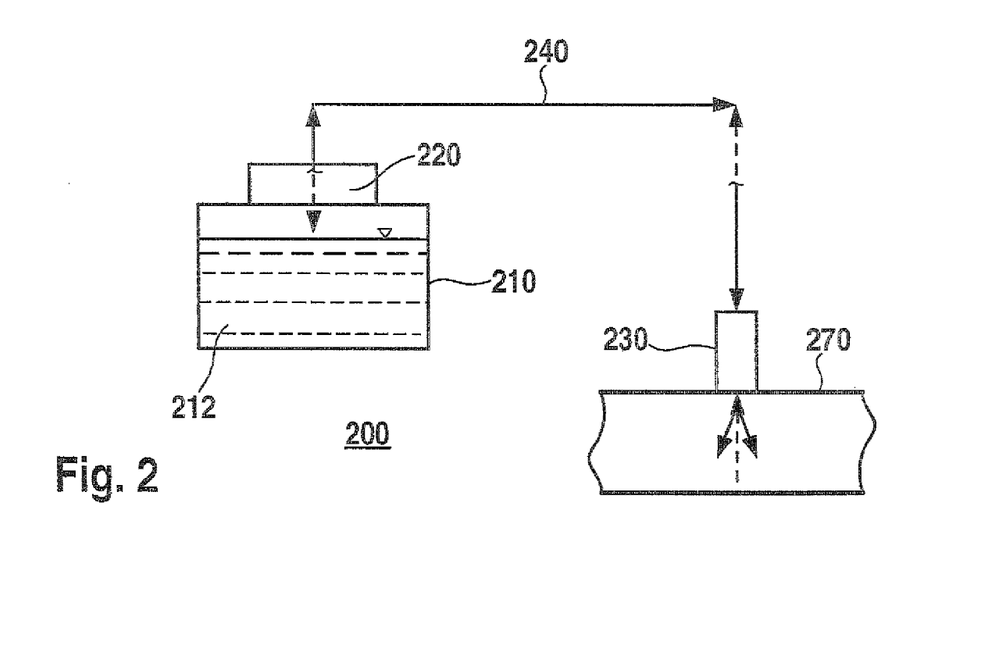
FIG. 2 shows an embodiment of the metering device of the invention in the injection and venting mode.

FIG. 2 show an embodiment of the metering device 200 of the invention, for explaining the ventilation function. The metering device shown in FIG. 2, like that device shown in FIG. 1, has a tank 210, a delivery unit 220, a metering valve 230, and a line 240 that furnishes the delivery module, which delivers reducing agent from the tank, to the metering valve 230. As in the embodiment of FIG. 1, the metering valve is secured to an exhaust pipe 270, so as to inject the tank contents 212 of the tank 210 into the volume enclosed by the exhaust pipe. The arrows drawn in solid lines indicate the feeding direction for the delivery unit 220, from the delivery of the tank contents 212 until the injection into the exhaust pipe 270.

If the vehicle in which the metering device of the invention is provided is parked, then precautions must be taken to prevent freezing of the reducing agent in the metering device, especially in components that are vulnerable to ice pressure. According to the invention, as the arrows drawn in dashed lines indicate, gas is aspirated from the exhaust pipe 270 by the metering valve. The aspirated gas takes the place of the reducing agent that had remained in the line 240, in the metering valve 230, and in the delivery unit 220, and so the metering device remains dry.

All of the reducing agent remaining in the line 240, in the valve 230, and in the delivery unit 220 is aspirated back into the tank 210. The volume that had been occupied by the reducing agent is now occupied by the gas taken from the exhaust pipe 270.

Preferably, the delivery unit aspirates the gas, counter to the usual feeding direction of the delivery unit, out of the exhaust pipe 270 after the engine has been shut off, or some time later, to assure that the at least some of the exhaust gas has flowed out of the exhaust pipe, so that what is aspirated by the metering device is ambient air or a mixture of ambient air and exhaust gas. The time that elapses between the shutoff of the engine and the onset of the aspiration process is preferably selected such that the remaining exhaust gas from combustion has already escaped for the most part from the exhaust pipe, for instance by convection or by the processes of diffusion, and at the same time it is assured that the reducing agent is still markedly above the freezing temperature. A temperature sensor is preferably used, which either measures the temperature of the reducing agent or measures the ambient temperature, so as to derive the instant when the reducing agent freezes. The best ratio of outside air to residual exhaust gas is attained if the aspiration process is begun shortly before the calculated, extrapolated, or measured instance of freezing, so that the proportion of exhaust gas that still remains in the exhaust pipe 270 is minimal. It is thus attained that neither heat nor exhaust gas contaminants are aspirated into the metering device and thereby contaminate the metering valve, the delivery unit, and/or the tank contents 212.

Figure 3:
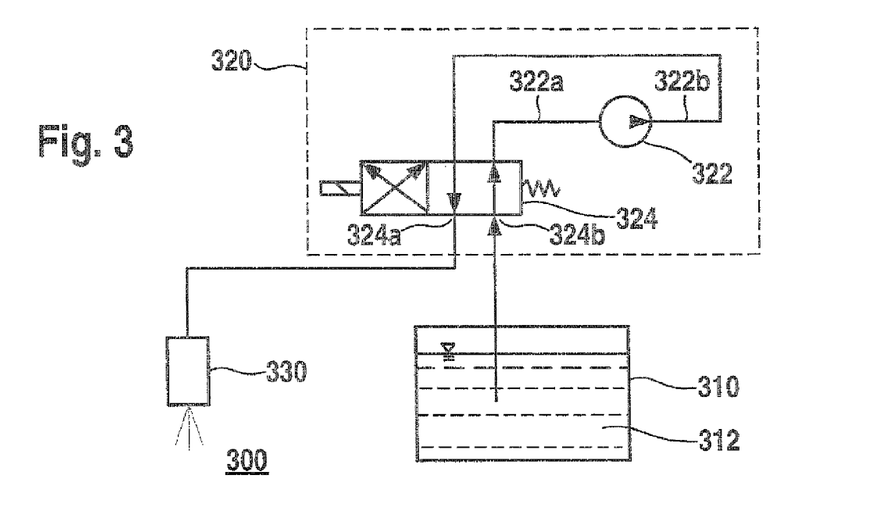
FIG. 3 shows an embodiment of the metering device of the invention with a delivery unit whose feeding direction can be reversed.

FIG. 3 shows an embodiment of the metering device 300 of the invention. It includes a tank 310 with tank contents 312 that are delivered by a delivery unit 320. The tank contents delivered by the delivery unit 320, or in other words the reducing agent, is furnished to the metering valve 330 and sprayed by it into an exhaust gas tract (not shown). The delivery unit 320 includes a feed pump 322, which is designed for only one pumping or operating direction. The inlet 322*a* of the pump 322 and the outlet 322*b* of the pump 322 are in communication with a repolarization valve 324. The repolarization valve furthermore has two connections 324*a, b*. One connection 324*a* of the repolarization valve 324 communicates with the metering valve 330 via a line. The other connection 324*b* of the repolarization valve communicates with a line that leads to the tank 310.

In FIG. 3, reference numeral 324 indicates a 4/2-way valve, which can change the feeding direction of the delivery unit 320. To that end, the first connection 324*a* of the repolarization valve 324 can be made to communicate with either the inlet 322*a* of the feed pump or the outlet 322*h* of the feed pump 322. In the same way, the second connection 324*b* of the repolarization valve 324 can be made to communicate with either the outlet 322*b* of the feed pump 322 or the inlet 322*a* of the feed pump 322. However, the repolarization valve 324 is arranged for connecting the first connection 324*a* to a point that differs from the point with which the second connection 324*b* is connected, and vice versa.

The repolarization valve is preferably a 4/2-way valve, which has a pneumatic, hydraulic or electric actuator, or which alternatively can be operated manually. In one embodiment, the restoration of the valve to an operating state in which reducing agent is fed into the exhaust gas tract is effected by means of spring force. Because of the possibility of externally controllable actuation, the repolarization valve 324 is called an active valve. In this description, the term "active valve" is applied logically to all other valves.

The feed pump 322 may be a hose pump or peristaltic pump, which is connected to an electric stepping motor or a direct current motor, for instance via a gear. Alternatively, a piston pump or other type of pump suitable for pumping fluid is used as the feed pump.

In a further, alternative embodiment, not shown, one connection of the pump communicates directly with the tank, and the other connection of the pump communicates directly with the metering valve, and the effective direction of the pump is reversible, in that the electric motor provided in it, and/or a suitable gear, reverses the pumping direction.

Figure 4:
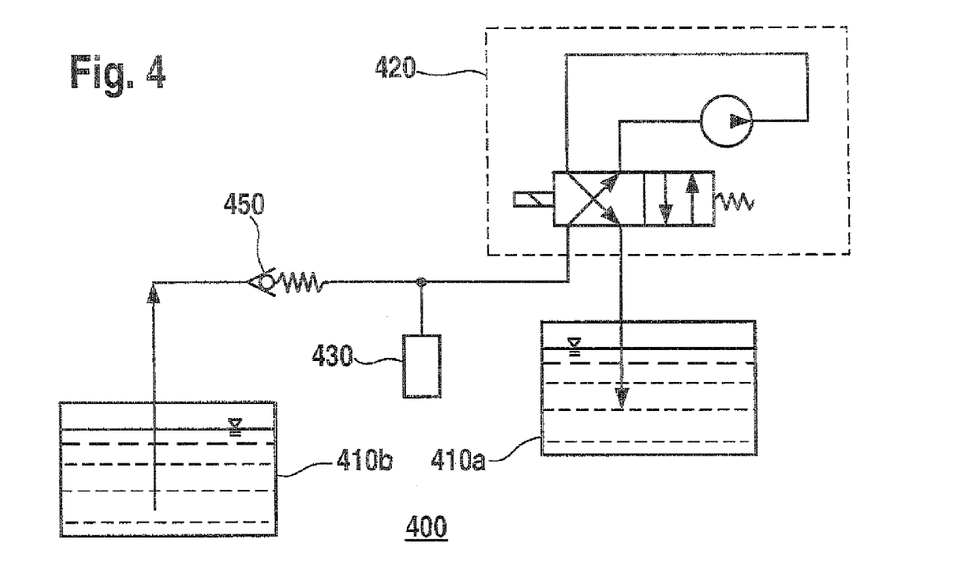
FIG. 4 shows an embodiment of the metering device of the invention with a storage tank, which fills a working tank.

In FIG. 4, a further embodiment of the metering device 400 of the invention is shown. The embodiment shown in FIG. 4 has two tanks, that is, one working tank 410*a* and one storage tank 410*b*. In the normal operating mode (not shown) a delivery unit 420 delivers the tank contents of the working tank 410*a* to a metering valve 430. If two separate tanks are used, even relatively small spaces in the motor vehicle can be used to accommodate reducing agent tanks.

In FIG. 4, a filling mode is shown in which the delivery unit 420 is used to deliver the tank contents from the storage tank 4105 into the working tank 410*a*. The storage tank 410*b* communicates with the delivery unit 420 via a connection/blocking valve 450. The metering valve 430 is likewise connected to the connection that connects the connection/blocking valve 450 to the delivery unit 420. In the filling mode shown in FIG. 4, the metering valve is closed, and the delivery unit 420 generates a negative pressure which is propagated onward to the storage tank 410*b* via the open connection/blocking valve 450. The delivery unit operates in the reverse feeding direction, so that the working tank 410*a* is filled. In other words, the negative pressure generated in the storage tank 410*b* corresponds to the overpressure that forces the reducing agent into the working tank 410*a*.

The embodiment shown in FIG. 4 includes a storage tank 410*b* and a working tank 410*a*, which can be accommodated in various places in a vehicle. In the normal operating mode, the delivery unit 420 is used to pump reducing agent out from the working tank 410*a* and thus to supply the metering valve 430. At the same time, the delivery unit has a second function, which is the refilling of the working tank 410*a* with the tank contents of the storage tank 410*b*; for that function, a communication merely has to be established between the storage tank 410*b* and the delivery unit. In the normal delivery mode, in which the metering valve 430 is supplied with the tank contents from the working tank 410*a*, the connection/blocking valve 450 prevents the tank contents of the working tank 410*a* from being fed into the storage tank 410*b*.

Thus for equipping the metering device with two functions, namely injection by means of the metering valve 430 and refilling of the working tank 410*a*, only the connection/blocking valve 450 is necessary.

In the embodiment shown in FIG. 4, the connection/blocking valve 450 is embodied as a passive valve with only a slight opening pressure. In this embodiment the delivery unit also includes a feed pump, which has only one effective direction, and a repolarization valve connected to the feed pump; see FIG. 3. Alternatively, instead of this delivery unit, a feed pump with a reversible effective direction can be used, and in that case the repolarization valve can be omitted. The repolarization valve is, as also shown in FIG. 3, preferably a 4/2-way valve, whose switching position can be controlled, for instance by means of mechanical and/or electric actuators.

Figure 5:
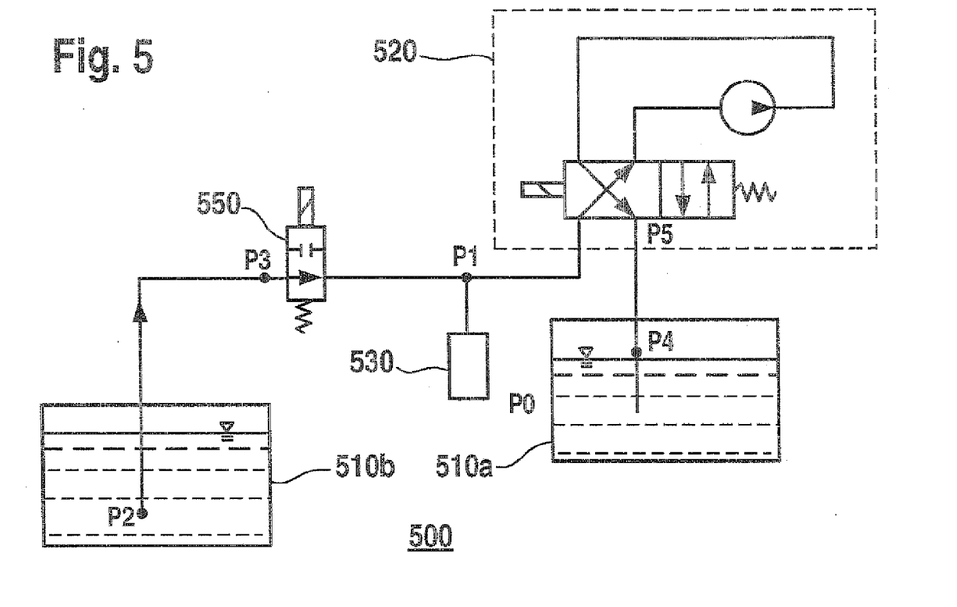
FIG. 5 shows a further embodiment of the metering device of the invention with an active connection/blocking valve, by way of which a working tank is supplied from a storage tank.

FIG. 5 shows a further embodiment of the metering device 500 of the invention in the filling mode, in which a working tank 510a is filled by means of the delivery unit 520 with the tank contents of a storage tank 510b. As in the embodiment shown in FIG. 4, the connection between the storage tank 510b and the delivery unit 520 communicates with the metering valve 530. As the connection/blocking valve that is disposed between the storage tank 510b and the delivery unit 520 upstream of the coupling point of the metering valve 530, an active connection/blocking valve is employed, whose opening and closing state can be controlled from outside. As in FIG. 4 as well, a connection/blocking valve 550 allows the tank contents to flow from the storage tank 510b into the working tank 510a via the delivery unit 520, and the metering valve 530 associated with this connection is closed.

For better illustration of the various operating modes, point P0 to P5 are defined. P0 indicates the exit point of the metering valve, this metering valve being closed in the refilling operating state shown in FIG. 5. Point P1 indicates the coupling point of the metering valve to the connection between the storage tank 510b and the delivery unit 420. At point P1, a T-element is preferably used, to which the various lines that lead to the connection/blocking valve 550, metering valve 530 and delivery unit 520 are connected. Point P2 indicates the point of entry of the tank contents of the storage tank into the line system, while point P4 indicates the coupling of the line system of the metering device to the tank contents of the working tank 510a.

Point P3 indicates the point of the coupling of the line coming from the storage tank 510b, while point P5 indicates the connection point of the delivery unit to the rest of the metering system.

The mode of operation shown in FIG. 5 is the same mode of operation that has been described in conjunction with FIG. 4. Also, the device shown in FIG. 5 is identical to the device shown in FIG. 4, including the closing and opening states of the individual components, except for the connection/blocking valve, which in FIG. 5 is shown as an active or in other words actuatable connection/blocking valve 550, while conversely the same element 450 in FIG. 4 is shown as a passive check valve 450, whose opening state is determined only by the difference between the connections of the valve 450.

Figure 6:
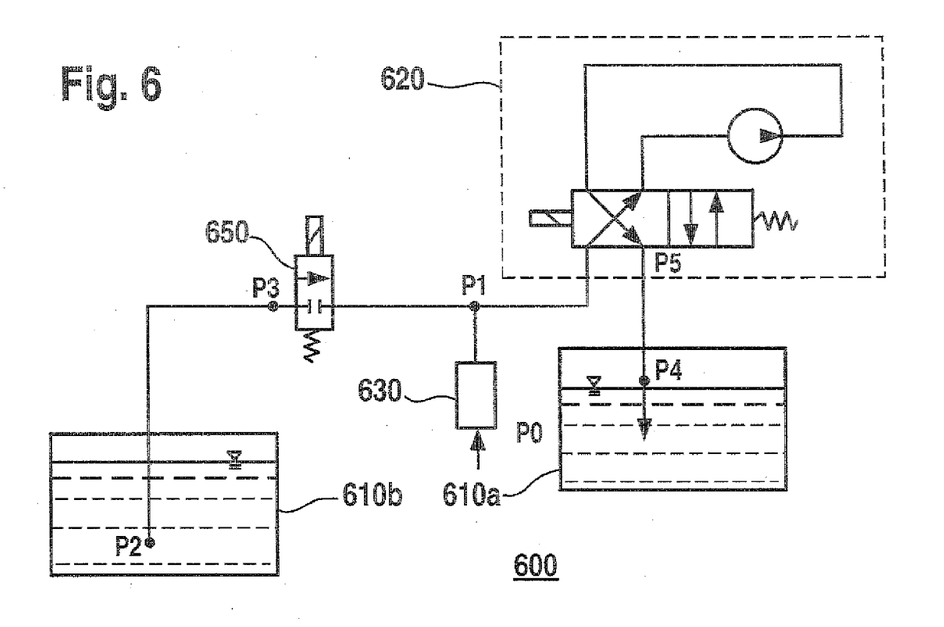
FIG. 6 shows an embodiment of the metering device of the invention in which air is aspirated via a metering valve.

In FIG. 6, the system of FIG. 5 is shown, which is in a first ventilating state. In this ventilating state, the metering valve 630 draws in gas, such as ambient air, exhaust gas, or a mixture of ambient air and exhaust gas, so that at least the metering valve 630 is emptied of reducing agent. In other words, there is no reducing agent between points P0 and P1. Depending on the duration of pumping, the lines and components between points P1 and P4 are also free of reducing agent. For venting, the delivery unit 620 runs in the reverse feeding direction and pumps the reducing agent located between points P0, P1, P5 and P4 into the working tank 610a. At the same time, the connection/blocking valve 650, which is embodied as an active connection/blocking valve, is closed, to prevent the tank contents from the storage tank 610b from entering the system as a result of the negative pressure between P0, P1 and P5.

It should be noted that in FIG. 6, the line system between P2, P3 and P1 and the connection/blocking valve 650 contains reducing agent, especially if the state shown in FIG. 6 was preceded by the filling mode of operation (see FIG. 5). However, the pipeline system and the components between P0, P1, P5 and P4 are free of reducing agent, since the reducing agent has been positively displaced by gas aspirated at point P0.

The operating state shown in FIG. 6 can be preceded by the operating state of filling the working tank. Alternatively, the normal mode of operation of the metering device can precede the mode of operation shown in FIG. 6. In the normal mode of operation, the connection/blocking valve 650 is blocked, and the delivery unit 620 operates in the feeding direction, so that it pumps reducing agent out of the working tank 610a to the metering valve 630. In the normal mode of operation, the metering valve 630 is open and sprays reducing agent into the exhaust gas tract connected to it. The term "normal mode of operation" is also used for the state in which the delivery unit is connected in the feeding direction, the connection/blocking valve 650 is closed, and the metering valve 630 is at least partly and/or intermittently closed. This is the case for instance when a quantity of reducing agent other than the maximum is to be introduced into the exhaust gas tract. In that case, the metering valve is opened and closed in accordance with a pulse width modulation, or it is opened to only a defined degree in accordance with an analog control signal.

Figure 7:
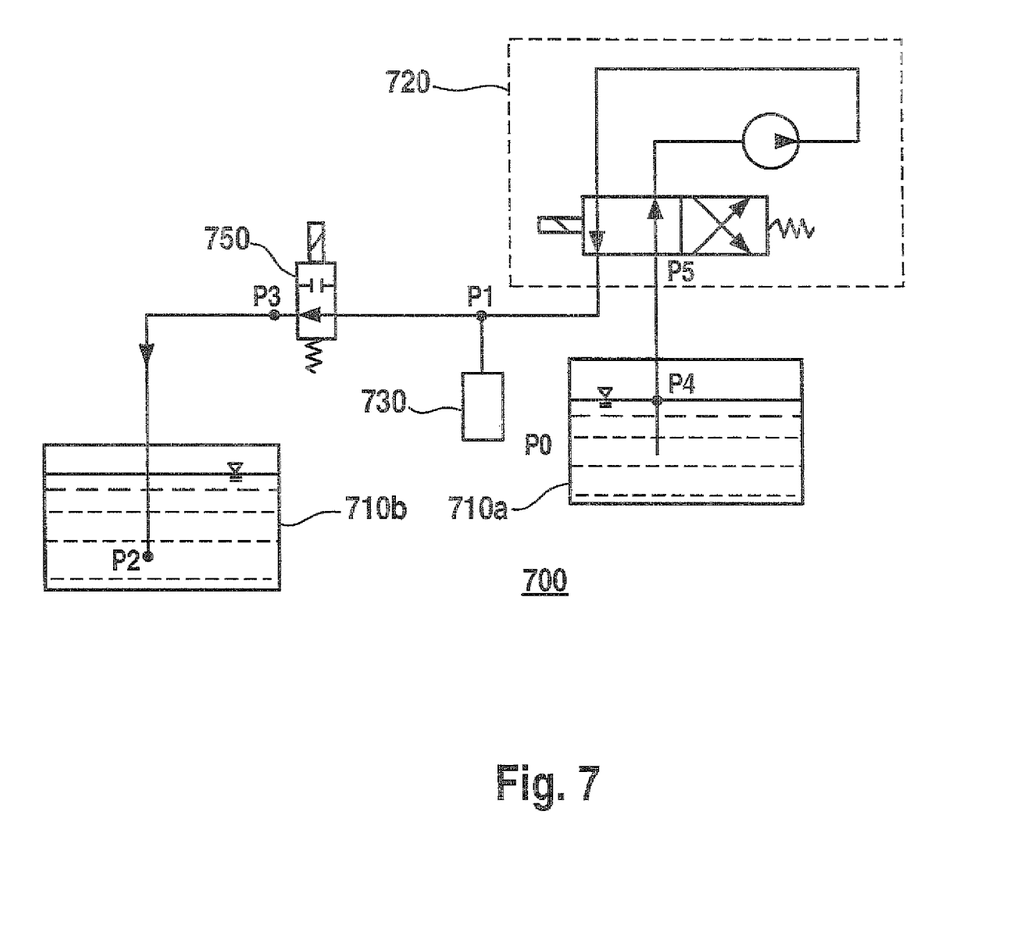
FIG. 7 shows an embodiment of the metering device of the invention in which an active connection/blocking valve is ventilated.

FIG. 7 shows an embodiment of the metering device 700 that is similar to the device of FIGS. 5 and 6. In contrast to FIGS. 5 and 6, FIG. 7 shows the metering device of the invention in a second ventilating state. In this second ventilating state, the metering valve 730 is closed; that is, at point P0, reducing agent is not dispensed, nor is gas aspirated. The delivery unit 720 operates in the feeding direction and at point P1 it builds up a pressure. In the second ventilating mode, the connection/blocking valve 750 is open. If the second ventilating mode was preceded by the first ventilating mode, then the partial system between points P1 and P4 contains gas that was aspirated by the metering valve 730. By reversal of the feeding direction, this gas is forced into the connection/blocking valve 750 as well as into the line segment between the blocking valve 750 and point P1. As a result, both the connection/blocking valve 750 and the line segment between point P1 and the connection/blocking valve 750 are emptied of reducing agent. Depending on the volume of gas that is stored in the partial system between P1 and P4, the line segment between P3 and P2 (the supply line to the storage tank) to the connection/blocking valve 750 can be emptied of reducing agent as well. Since the connection/blocking valve 750 in particular is vulnerable to ice pressure, point P3 should be placed as close as possible to point P1, so that the connection/blocking valve 750 is embodied after even a brief activation of the delivery unit 720 in the second ventilating mode.

It should be noted at this point that after the termination of the first ventilating state shown in FIG. 6, the line between P4 and P5 is indeed free of reducing agent, but upon a reversal of the feeding direction, reducing agent is again aspirated form the working tank into the delivery unit. The line system between P1, P5 and P4 and the delivery unit 720 itself should therefore have a volume that is markedly larger than the volume of the line segment between P3 and P1 and the connection/blocking valve 750. The line segment between P3 and P2 is not as vulnerable to freezing reducing agent, since an expansion hose can be used as the line between P3 and P2. This is also true for the line between P4 and P5.

If therefore, by closure of the metering valve and reversal of the feeding direction, reducing agent from the storage tank is furnished to the working tank (see FIG. 5), then the first ventilating mode should thereupon be established (see FIG. 6). In the first ventilating mode, the feeding direction is still reversed, and both the metering valve and the delivery unit are emptied of reducing agent. In the event that this was preceded by a filling mode, as shown in FIG. 5, then the second ventilating mode shown in FIG. 7 preferably follows. In it, the gas aspirated in the first ventilating mode is forced, by reversal of the feeding direction and closure of the metering valve 730, through the connection/blocking valve 750, as a result of which the connection/blocking valve 750 as well is emptied of reducing agent.

If the delivery unit 720 is designed only for pumping reducing agent, then preferably the internal volume of the line between P1 and the inlet of the delivery unit 720 is designed to be greater than the total of the internal volumes that are defined by the connection/blocking valve 750 and by the line between P1 and the connection/blocking valve. As a result, the first ventilating mode shown in FIG. 6 can be limited to a time slot by aspirating a defined gas volume that suffices for evacuating the metering valve 730 and the line between P1 and the delivery unit, and that at the same time is sufficient for freeing the volume between P1 and P3 (and in particular the connection/blocking valve) of reducing agent in the second ventilating mode. At the same time, the defined volume can be provided such that after the first ventilating mode, no gas enters the delivery unit.

The volumes can be arrange by equipping the lines with defined lengths and/or diameters. For providing volumes, chamber can also be employed.

In one embodiment of the invention, the second ventilating mode is performed only when there is reducing agent in the connection/blocking valve 750, such as following a tilling mode. However, if the connection/blocking valve has already been emptied, for instance by means of a preceding second ventilating mode, then after the first ventilating mode (FIG. 6) is performed, there is no need for a second ventilating mode. On the contrary, in that case the normal mode of operation can be provided, in that the delivery unit pumps reducing agent in the feeding direction out of the working tank, and the metering valve injects reducing agent into the exhaust gas tract. In other words, the second ventilating mode is performed only when the second ventilating mode (FIG. 7) was performed earlier than the last time the filling mode (FIG. 6) was performed, by which the connection/blocking valve and the line between P3 and P1 is filled with reducing agent.

Preferably, a controller causes the closing or opening of the connection/blocking valve and metering valve and furthermore controls the delivery unit and its feeding direction. The metering valve is also advantageously connected to the controller, so as to block the metering valve during the filling mode and the second ventilating mode, to allow the drawing in of gas into the metering valve during the first ventilating mode, and in the normal mode of operation to expel reducing agent from the metering valve. Preferably, the controller closes the connection/blocking valve in both the first mode of operation and the normal mode of operation, opens the connection/blocking valve in the filling mode in the flow direction from the storage tank to the working tank, and opens the connection/blocking valve in the reverse flow direction in the second ventilating mode. Moreover, the controller is preferably arranged for operating the delivery unit in the feeding direction from the working tank to the metering valve or the storage tank in both the normal mode of operation and the second mode of operation, and for operating the delivery unit in the reverse feeding direction when the metering device is in the first ventilating mode (FIG. 6) or in the filling mode (FIG. 5).

In one embodiment, the metering valve is a throttle whose flow rate can be adjusted freely between 0% and 100%, for example by a continuous-value signal and/or a pulse width modulated signal. Alternatively, the metering valve can include one element that either fully closes or fully opens, while a second element that is closed beforehand or afterward determines the flow rate on the basis of a control signal.

To compensate for the withdrawn or supplied volume of gas or liquid, the working tank and the storage tank communicate with the surroundings via ventilating or venting throttles or valves. Alternatively, one or both tanks can be connected to buffer volumes, such as a bellows or a balloon, which compensate for a change in volume and avoid a direct fluid exchange.

Preferably, the individual components of the metering device communicate via lines with expansible elastic walls, so that a change in volume from freezing does not cause any deformation.

The foregoing relates to the preferred exemplary embodiments of the invention, it being understood that other variants and embodiments thereof are possible within the spirit and scope of the invention, the latter being defined by the appended claims.

The invention claimed is:

1. A metering device for introducing liquid reducing agent into an exhaust gas tract, comprising:
   a working tank which includes a tank contents;
   a delivery unit which communicates with the working tank and has a reversible feeding direction;
   a storage tank that communicates with the delivery unit via a filling line, and the filling line includes a connection/blocking valve which blocks a fluid flow into the storage tank; and
   a metering valve which communicates with the delivery unit and is supplied with the tank contents by the delivery unit, the metering valve being arranged for dispensing the tank contents in a dispensing direction,
   wherein the metering valve is in fluidic communication with the filling line, and
   wherein the metering valve communicates with the delivery unit such that the delivery unit, when the feeding direction is reversed, builds up a negative pressure between the delivery unit and the metering valve and, as a result of the negative pressure build-up, gas originating in the exhaust gas tract is aspirated through the metering valve in a direction opposite to the dispensing direction.

2. The metering device as defined by claim 1, wherein the working tank communicates with the metering valve via a supply line and supplies the metering valve with the tank contents and, when the feeding direction is reversed, the gas originating in the exhaust gas tract is aspirated contrary to the dispensing direction.

3. The metering device as defined by claim 1, wherein the delivery unit includes either a feed pump with a reversible effective direction or a feed pump and a repolarization valve which communicates with the feed pump and is arranged for transposing an inlet of the feed pump with an outlet of the feed pump.

4. The metering device as defined by claim 2, wherein the delivery unit includes either a feed pump with a reversible effective direction or a feed pump and a repolarization valve which communicates with the feed pump and is arranged for transposing an inlet of the feed pump with an outlet of the feed pump.

5. The metering device as defined by claim 1, wherein the connection/blocking valve is arranged for controllably blocking the fluid flow into the storage tank, and the metering valve is arranged for controllably blocking a fluid flow directed through it, and when the storage tank is open, the metering valve is blocked, and the delivery unit is being operated in the feeding direction, gas is conducted through the connection/blocking valve to the storage tank.

6. The metering device as defined by claim 2, wherein the connection/blocking valve is arranged for controllably blocking the fluid flow into the storage tank, and the metering valve is arranged for controllably blocking a fluid flow directed through it, and when the storage tank is open, the metering valve is blocked, and the delivery unit is being operated in the feeding direction, gas is conducted through the connection/blocking valve to the storage tank.

7. The metering device as defined by claim 3, wherein the connection/blocking valve is arranged for controllably blocking the fluid flow into the storage tank, and the metering valve is arranged for controllably blocking a fluid flow directed through it, and when the storage tank is open, the metering valve is blocked, and the delivery unit is being operated in the feeding direction, gas is conducted through the connection/blocking valve to the storage tank.

8. A method for operating a metering device for introducing liquid reducing agent into an exhaust gas tract, comprising the steps of:
provuding a delivery unit which communicates with both a metering valve and a working tank;
dispensing liquid reducing agent through the metering valve in a dispensing flow direction;
evacuating the metering valve with aspirating gas in an evacuation direction that is contrary to the dispensing flow direction by operating the delivery unit in a direction opposite to a feeding direction;
filling the working tank with contents of a storage tank connected to it by blocking fluid flow through the metering valve, and
operating the delivery unit in the direction opposite to the feeding direction for filling the working tank with contents of the storage tank.

9. The method as defined by claim 8, further includes the steps of:
providing a connection/blocking valve in a fill line provided between the storage tank and the delivery unit;
evacuating the connection/blocking valve, after evacuating the metering valve, by opening the connection/blocking valve;
blocking the metering valve; and
operating the delivery unit in the feeding direction after opening the connection/blocking valve and blocking the metering valve.

10. The method as defined by claim 8, further including the step of:
compensating for pressure differences between surroundings and the storage tank as well as between the surroundings and the working tank by introducing gas from the surroundings or removing gas into the surroundings.

11. The metering device as defined by claim 1, wherein the working tank contents is a liquid reducing agent.

12. The metering device as defined by claim 11, wherein the metering device has a first ventilating mode and, when the metering device is in the first ventilating mode, the connection/blocking valve is closed, the delivery unit runs in the reversed feeding direction and the metering valve draws in gas so that at least the metering valve is emptied of reducing agent.

13. The metering device as defined by claim 11, wherein the metering device has a first ventilating mode and, when the metering device is in the first ventilating mode, the connection/blocking valve is closed, the delivery unit runs in the reversed feeding direction and the metering valve draws in gas so that the metering valve and the delivery unit are emptied of reducing agent.

14. The metering device as defined by claim 12, wherein the metering device has a second ventilating mode and, when the metering device is in the second ventilating mode, the connection/blocking valve is open, the delivery unit runs in the feeding direction and the metering valve is closed so that no reducing agent is dispensed nor gas aspirated.

15. The metering device as defined by claim 13, wherein the metering device has a second ventilating mode and, when the metering device is in the second ventilating mode, the connection/blocking valve is open, the delivery unit runs in the feeding direction and the metering valve is closed so that no reducing agent is dispensed nor gas aspirated.

16. The metering device as defined by claim 14, wherein the second ventilating mode is performed only when there is reducing agent in the connection/blocking valve.

17. The metering device as defined by claim 15, wherein the second ventilating mode is performed only when there is reducing agent in the connection/blocking valve.

* * * * *